(12) United States Patent
Holmes

(10) Patent No.: US 12,038,726 B2
(45) Date of Patent: Jul. 16, 2024

(54) METHODS AND SYSTEMS FOR MANAGING VEHICLE-GRID INTEGRATION

(71) Applicant: Honda Motor Co., Ltd., Tokyo (JP)

(72) Inventor: John Holmes, San Diego, CA (US)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 17/402,063

(22) Filed: Aug. 13, 2021

(65) Prior Publication Data

US 2023/0046454 A1 Feb. 16, 2023

(51) Int. Cl.
| | |
|---|---|
| *G05B 13/02* | (2006.01) |
| *B60L 53/62* | (2019.01) |
| *B60L 53/63* | (2019.01) |
| *B60L 55/00* | (2019.01) |
| *B60L 58/12* | (2019.01) |
| *H02J 13/00* | (2006.01) |
| *B60K 6/28* | (2007.10) |

(52) U.S. Cl.
CPC ............ *G05B 13/024* (2013.01); *B60L 53/62* (2019.02); *B60L 53/63* (2019.02); *B60L 55/00* (2019.02); *B60L 58/12* (2019.02); *H02J 13/00002* (2020.01); *B60K 6/28* (2013.01); *B60L 2240/54* (2013.01); *B60L 2240/62* (2013.01); *B60L 2240/66* (2013.01); *B60L 2240/68* (2013.01); *B60Y 2200/91* (2013.01); *B60Y 2200/92* (2013.01); *B60Y 2300/91* (2013.01)

(58) Field of Classification Search
CPC .......... B60L 55/00; B60L 53/62; B60L 53/63; B60L 58/12; B60L 2240/54; B60L 2240/62; B60L 2240/66; B60L 2240/68; G05B 13/024; H02J 13/00002; B60K 6/28; B60Y 2200/91; B60Y 2200/92; B60Y 2300/91
See application file for complete search history.

(56) References Cited

U.S. PATENT DOCUMENTS

| | | | |
|---|---|---|---|
| 7,747,739 B2 | 6/2010 | Bridges et al. | |
| 8,019,483 B2 | 9/2011 | Keefe | |

(Continued)

FOREIGN PATENT DOCUMENTS

| | | |
|---|---|---|
| CN | 109166036 A | 1/2019 |
| CN | 110599261 A | 12/2019 |

(Continued)

*Primary Examiner* — Santosh R Poudel
(74) *Attorney, Agent, or Firm* — Stinson LLP

(57) ABSTRACT

A vehicle-grid integration management system determines use of a power grid by an electric vehicle in a dual multi-part rate structure including a grid account portion associated with a relationship between the electric vehicle and the power grid, a group account portion associated with a relationship between the vehicle group and the electric vehicle and/or the power grid, a consumption portion associated with a volume of electricity drawn from the power grid by the electric vehicle over a time period, a supply portion associated with a volume of electricity delivered to the power grid by the electric vehicle over the time period, a demand portion associated with an upper threshold of electricity drawn from the power grid by the electric vehicle over the time period, and a capacity portion associated with an upper threshold of electricity delivered to the power grid by the electric vehicle over the time period.

17 Claims, 6 Drawing Sheets

(56) References Cited

U.S. PATENT DOCUMENTS

| | | | |
|---|---|---|---|
| 9,153,966 | B2 | 10/2015 | Ishida |
| 9,840,156 | B2 | 12/2017 | DeBoer, III |
| 10,414,283 | B2 | 9/2019 | Kudo et al. |
| 10,661,678 | B2 | 5/2020 | Vidhi et al. |
| 2010/0079004 | A1* | 4/2010 | Keefe .................... B60L 53/63 307/80 |
| 2010/0082464 | A1* | 4/2010 | Keefe .................... G06Q 40/12 705/30 |
| 2010/0138066 | A1 | 6/2010 | Kong |
| 2016/0063456 | A1 | 3/2016 | Droege |
| 2016/0159239 | A1* | 6/2016 | Shi ......................... B60L 53/14 320/134 |
| 2018/0154790 | A1* | 6/2018 | Homma .................. B60L 53/63 |
| 2018/0218459 | A1 | 8/2018 | Yokoyama et al. |
| 2019/0275894 | A1 | 9/2019 | Amacker et al. |
| 2020/0156495 | A1 | 5/2020 | Lindup |
| 2020/0231063 | A1 | 7/2020 | Sadano et al. |
| 2021/0086647 | A1* | 3/2021 | Kiessling ............... B60L 53/67 |
| 2021/0313805 | A1* | 10/2021 | Morishima ............. B60L 53/68 |
| 2022/0048400 | A1* | 2/2022 | Sumi ...................... G08G 1/127 |
| 2022/0371574 | A1* | 11/2022 | Chevalier ......... B60W 60/0023 |

FOREIGN PATENT DOCUMENTS

| | | | |
|---|---|---|---|
| CN | 111091265 | A | 5/2020 |
| JP | 2018207590 | A | 12/2018 |
| WO | 2008073453 | A1 | 6/2008 |

* cited by examiner

METHODS AND SYSTEMS FOR MANAGING VEHICLE-GRID INTEGRATION

BACKGROUND

Electric vehicles (EVs) may include energy storage systems ("battery or batteries") that may be charged or discharged at charging station facilities using Electric Vehicle Supply Equipment (EVSE). As the demand for EVs grows, the power grid may become increasingly strained, which may lead to higher electricity costs. Methods and systems for energy management are generally supplier-oriented, focusing on the generation, transmission, and/or distribution of power and/or energy. With EVSEs supporting bi-directional control of power, so-called Vehicle-to-grid (V2G) solutions may allow EVs to deliver energy back to the power grid to reduce these costs and improve grid performance. Managing a plurality of EVs, however, may be tedious, time-consuming, and/or expensive and could lead to inequitable or undesirable results, particularly when managed at scale. Demarcation between the power grid and the host facility is referred to as the point of common coupling and commonly defines the border between utility-owned equipment and facility equipment.

SUMMARY

Examples described herein enable one or more electric vehicles (EVs) to actively participate in power and energy management in an organized, systematic, and controllable manner. In one aspect, a vehicle-grid integration (VGI) management system includes one or more computer storage media including data associated with one or more vehicles in a vehicle group including a first vehicle and computer-executable instructions, and one or more processors configured to execute the computer-executable instructions to determine use of a power grid by the first vehicle in a dual multi-part rate structure including a grid account portion associated with a relationship between the first vehicle and the power grid, a group account portion associated with a relationship between the vehicle group and one or more of the first vehicle or the power grid, a consumption portion associated with a volume of electricity drawn from the power grid by the first vehicle over a predetermined time period, a supply portion associated with a volume of electricity delivered to the power grid by the first vehicle over the predetermined time period, a demand portion associated with an upper threshold of electricity drawn from the power grid by the first vehicle over the predetermined time period, and a capacity portion associated with an upper threshold of electricity delivered to the power grid by the first vehicle over the predetermined time period.

In another aspect, a computing system is provided for managing vehicle-grid integration. The computing system includes a group module that determines a relationship between an electric vehicle and a vehicle group, and a manager module that determines a dual multi-part rate structure including a first plurality of parameters associated with a drawing of electrical energy from the power grid by the electric vehicle and a second plurality of parameters associated with a delivery of electrical energy to the power grid by the electric vehicle. The first plurality of parameters includes a first volume and a first threshold amount over a predetermined time period. The second plurality of parameters includes a second volume and a second threshold amount over the predetermined time period.

In yet another aspect, a method is provided for managing vehicle-grid integration. The method includes determining a relationship between an electric vehicle and a vehicle group and determining a first plurality of parameters associated with a drawing of electrical energy from the power grid by the electric vehicle and a second plurality of parameters associated with a supply of electrical energy to the power grid by the electric vehicle. The first plurality of parameters includes a first volume and a first threshold amount over a predetermined time period. The second plurality of parameters includes a second volume and a second threshold amount over the predetermined time period. The method further includes determining use of the power grid by the electric vehicle in a dual multi-part rate structure including a grid account portion associated with a relationship between the electric vehicle and the power grid, a group account portion associated with the relationship between the electric vehicle and the vehicle group, a consumption portion associated with the first volume, a supply portion associated with the second volume, a demand portion associated with the first threshold amount, and a capacity portion associated with the second threshold amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The novel features believed to be characteristic of the disclosure are set forth in the appended claims. The drawings are not necessarily drawn to scale and certain drawings may be shown in exaggerated or generalized form in the interest of clarity and conciseness. The disclosure itself, however, will be best understood by reference to the following Detailed Description when read in conjunction with the accompanying drawings, wherein:

Figure 1:
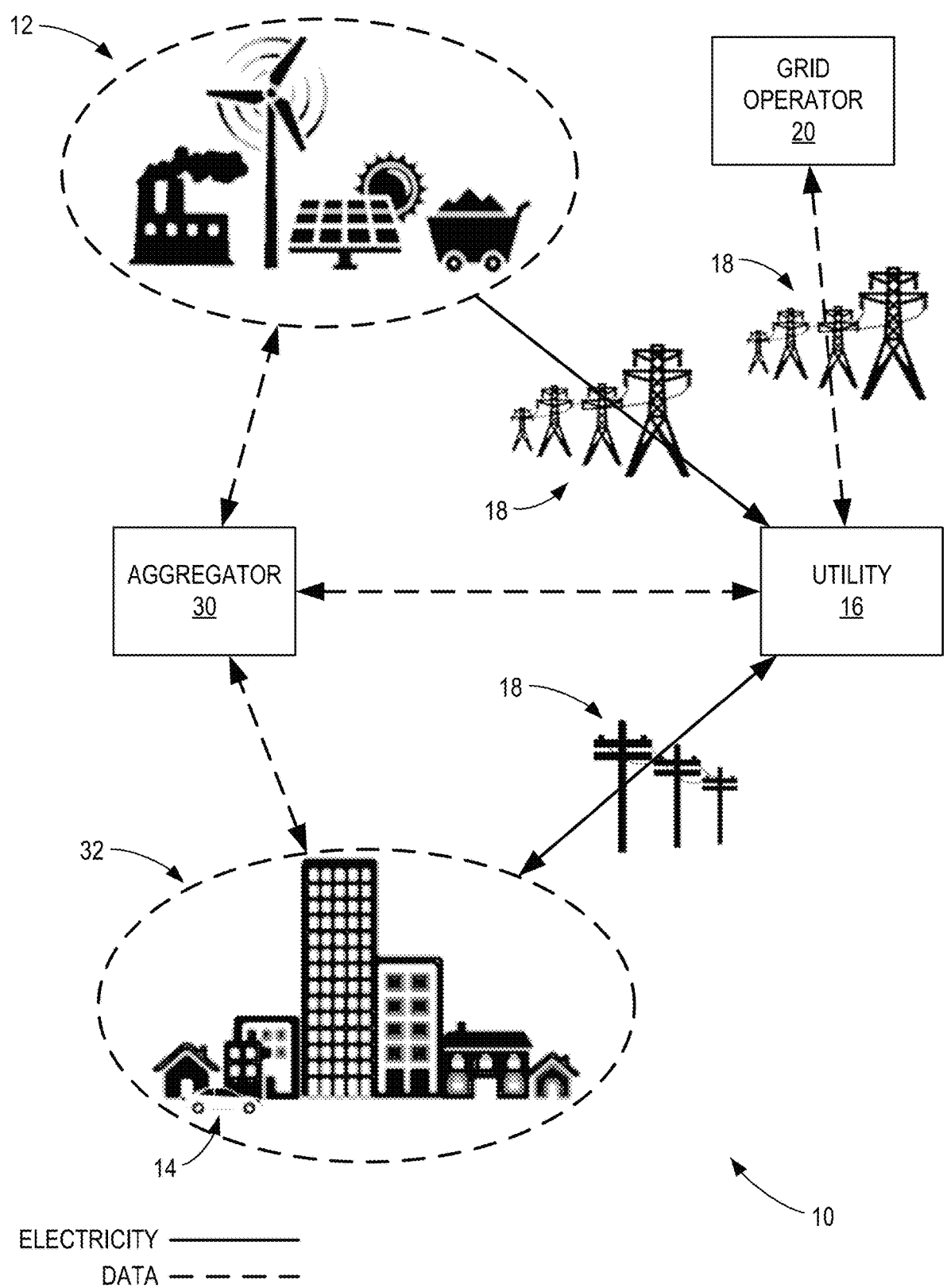
FIG. 1 is a block diagram of an example electric system in accordance with aspects of the present disclosure.

Like parts are marked throughout the drawings, as well as throughout the Detailed Disclosure, with the same numerals. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to asset management systems and, more particularly, to methods and systems for managing vehicle-grid integration (VGI). VGI objectives include achieving grid-compatible load profiles and avoiding scenarios resulting in poorly coordinated charging of vehicles. Examples described herein enable a plurality of electric vehicles (EVs) to aggregate their energy capacity and gain leverage against suppliers of conventional and/or renewable power by strategically dispatching the EVs to draw and/or deliver electricity in an organized manner. For example, the EVs may be dispatched to provide ancillary services that control voltage and/or frequency on a local level by observation of bulk demand and capacity. Example computing systems may include a network interface to obtain various parameters for use in managing one or more grid services for the power grid. The computing system may include a group module that determines a relationship between an EV with a predetermined set of parameters described below (e.g., battery state of charge, available liquid or gaseous fuel capacity) and a vehicle group representing a predetermined cumulative aggregation of available dispatchable capacity over a defined time period or periods. Under networked control by an aggregator or an EV service provider (EVSP), the EVs may be used to selectively draw electricity from the power grid when and where vehicle group supply is relatively low, vehicle group demand is relatively high, grid capacity is relatively high, and/or grid demand is relatively low, as well as selectively delivering electricity to the power grid when and where vehicle group supply is relatively high, vehicle group demand is relatively low, grid capacity is relatively low, and/or grid demand is relatively high.

In order to continuously achieve a balance of supply and demand, the state of the EVs, power grid, and/or power stations may be continuously monitored. For example, the computing systems described herein may monitor use of the power grid by each EV and use of the EVs by each charging station or EVSE. In this manner, the computing systems described herein may provide targeted grid services to achieve one or more objectives (e.g., power quality and stability objectives, efficiency improvements, energy cost savings, greenhouse gas savings and others) using real-time and forecast market data. Moreover, such data may be combined with a novel adaptation of a dual multi-part rate structure that addresses the notion of cost causation and reflects the nature of the costs incurred to provide the service. Unlike a Net Energy Metering tariff, the dual multi-part rate structure described herein may be used to equitably attribute operational and/or environmental benefits to appropriate participants, as well as equitably allocate consumption charges across the various users from a Distributed Energy Resource (DER) perspective. The various uses and/or services may be monitored to manage a plurality of rate categories, including residential, residential VGI, commercial and industrial (C&I), and/or C&I VGI.

Referring now to the drawings, which are provided for purposes of illustrating one or more examples and not for purposes of limiting the same, with reference to FIG. 1, an example electric system 10 includes at least one power station 12 that generates electricity, at least one user 14 that consumes and/or stores electricity, and at least one load serving entity (LSE) or utility 16 that delivers electricity (e.g., to and/or from the user 14). The electricity may be delivered using one or more substations, transformers, and/or power lines 18 connecting the power stations 12 and users 14. In some examples, the utility 16 may procure electricity from one or more power stations 12. Additionally or alternatively, the utility 16 may generate electricity (e.g., using its own power generators) and/or procure electricity from one or more other utilities 16 or other entities (e.g., from a wholesale market organized by a grid operator 20, such as a regional transmission organization (RTO) or an independent system operator (ISO)). In some examples, utilities 16 may procure capacity (e.g., from power stations 12, other utilities 16, and/or grid operators 20) to ensure a reliable supply of power (e.g., during periods of peak demand).

As shown in FIG. 1, the electric system 10 may include at least one aggregator 30 (e.g., a retail Direct Access Energy Provider (DAEP), an Electric Vehicle Service Provider (EVSP), an Energy Services Provider (ESP), an Energy Services Company (ESCO), a Community Choice Aggregator (CCA) or other) that serves as an intermediary between a group of users 14 (e.g., a user group 32) and the utility 16. In some examples, the aggregator 30 may manage an energy capacity program for procuring electricity from and/or delivering electricity to one or more power stations 12, utilities 16, and/or other entities (e.g., grid operators 20) on behalf of the user group 32. In some examples, the energy capacity program may facilitate the provision of grid services including, for example, a demand response, a load curtailment, a load shifting, a coordinated load profile, and/or simultaneous execution of multiple use cases, as well as enable usage of distributed energy resources.

Figure 2:
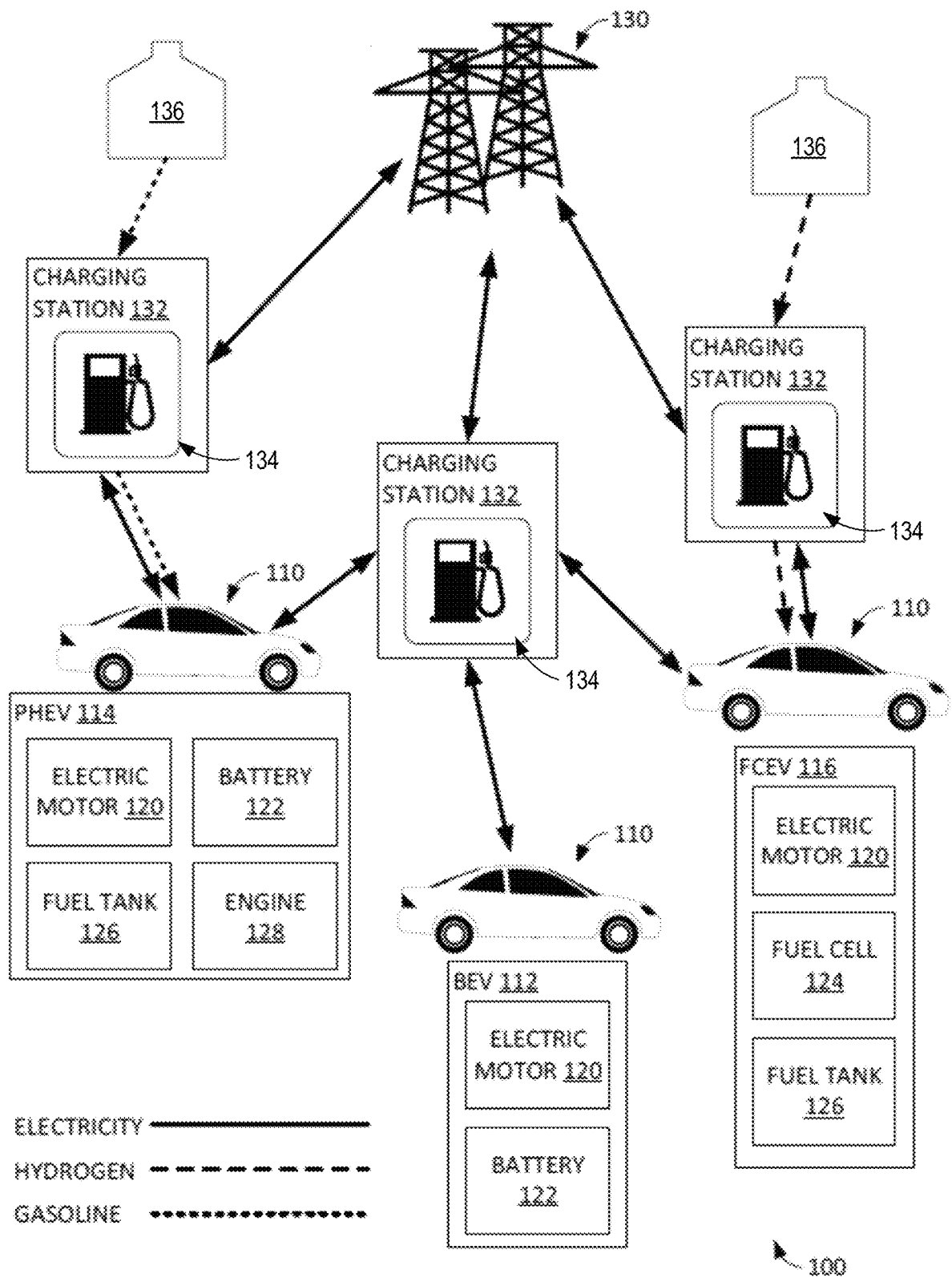
FIG. 2 is a block diagram of an example environment including a plurality of vehicles in accordance with aspects of the present disclosure.

FIG. 2 shows an example environment 100 including a plurality of electric vehicles (EVs) 110 (e.g., users 14). In some examples, the EVs 110 may be arranged or managed in one or more groups or sets based on type and/or emission characteristics. For example, a first set of EVs 110 may include a battery electric vehicle (BEV) 112, a second set of EVs 110 may include a plug-in hybrid electric vehicle (PHEV) 114, and a third set of EVs 110 may include a fuel cell electric vehicle (FCEV) 116. Alternatively, the EVs 110 may be managed based on any combination of characteristics that enables or allows the environment 100 to function as described herein. While the environment 100 is described and shown to include one BEV 112, one PHEV 114, and one FCEV 116, one of ordinary skill in the art would understand and appreciate that the environment 100 described herein may include any quantity of any type of EV 110. As used herein, an "electric vehicle" refers to any moving vehicle that is at least partially powered by electricity. The term "vehicle" includes, but is not limited to, cars, trucks, vans, minivans, sport utility vehicles (SUVs), motorcycles, scooters, boats, go-karts, amusement ride cars, industrial logistics equipment, port and airport ground support equipment, rail transport, railway support equipment, light-rail and subway transport, personal or commercial watercraft, and aircraft.

Each EV 110 includes an electric motor 120 that converts electrical energy or electricity into mechanical power. The electric motor 120 may be used to generate mechanical power for use in moving or propelling the EV 110 (e.g., via a drivetrain). In some examples, the electric motor 120 may be powered by an onboard battery pack including one or more batteries 122 and/or by an onboard fuel-cell stack including one or more fuel cells 124. For example, as shown in FIG. 2, the electric motor 120 of the BEV 112 may be powered entirely by energy stored in the batteries 122, the electric motor 120 of the PHEV 114 may be powered at least partially by energy stored in the batteries 122, and the electric motor 120 of the FCEV 116 may be powered entirely or partially by energy generated by fuel cells 124.

In some examples, an EV 110 may include an onboard fuel tank 126 storing fuel that may be channeled to the fuel cells 124 and/or to an internal combustion engine 128. The internal combustion engine 128 may ignite or combust the fuel using a spark plug (e.g., in a gasoline or other fueled internal combustion engine) or mechanical or adiabatic compression (e.g., in a diesel engine) to generate mechanical power for use in moving or propelling the EV 110 (e.g., via a drivetrain). In this manner, the EVs 110 may be moved or propelled from mechanical power generated using an electric motor 120 and/or an internal combustion engine 128. For example, as shown in FIG. 2, the BEV 112 may be powered from energy stored in the batteries 122, the PHEV 114 may be powered from energy stored in batteries 122 and/or from combustions in the internal combustion engine 128, and the PHEV 114 may be powered from electrochemical reactions in fuel cells 124. Example fuels that may be stored in the fuel tank 126 (e.g., for use with fuel cells 124 and/or internal combustion engine 128) include gasoline, diesel, hydrogen, natural gas, biodiesel, ethanol, and propane.

The EVs 110 may connect to a power grid 130 (e.g., electric system 10) at one or more charging stations 132 coupled to the power grid 130. Each charging station 132 may include instrumentation or at least one electric vehicle supply equipment (EVSE) 134 configured to connect EVs 110 to the power grid 130 in a safe and efficient manner. EVSE 134 may enable EVs 110 to draw electricity from the power grid 130 and/or feed electricity into the power grid 130. For example, the BEV 112 and/or PHEV 114 may use EVSE 134 to charge or discharge their respective batteries 122, and/or the FCEV 116 may use EVSE 134 to provide or supply electricity generated by its fuel cells 124. Example EVSE 134 may include connectors, plugs, sockets, and/or chargers, such as a standard electrical socket, a high-capacity appliance socket, a dedicated EV socket, an external charger, and/or an inductive charging mat. In some examples, one or more charging stations 132 may be coupled to one or more fuel sources 136, such as a pipeline or a tank. As shown in FIG. 2, the PHEV 114 and FCEV 116 may draw hydrogen, gasoline, or diesel from fuel sources 136 to fill their respective fuel tanks 126 at the charging stations 132.

Figure 3:
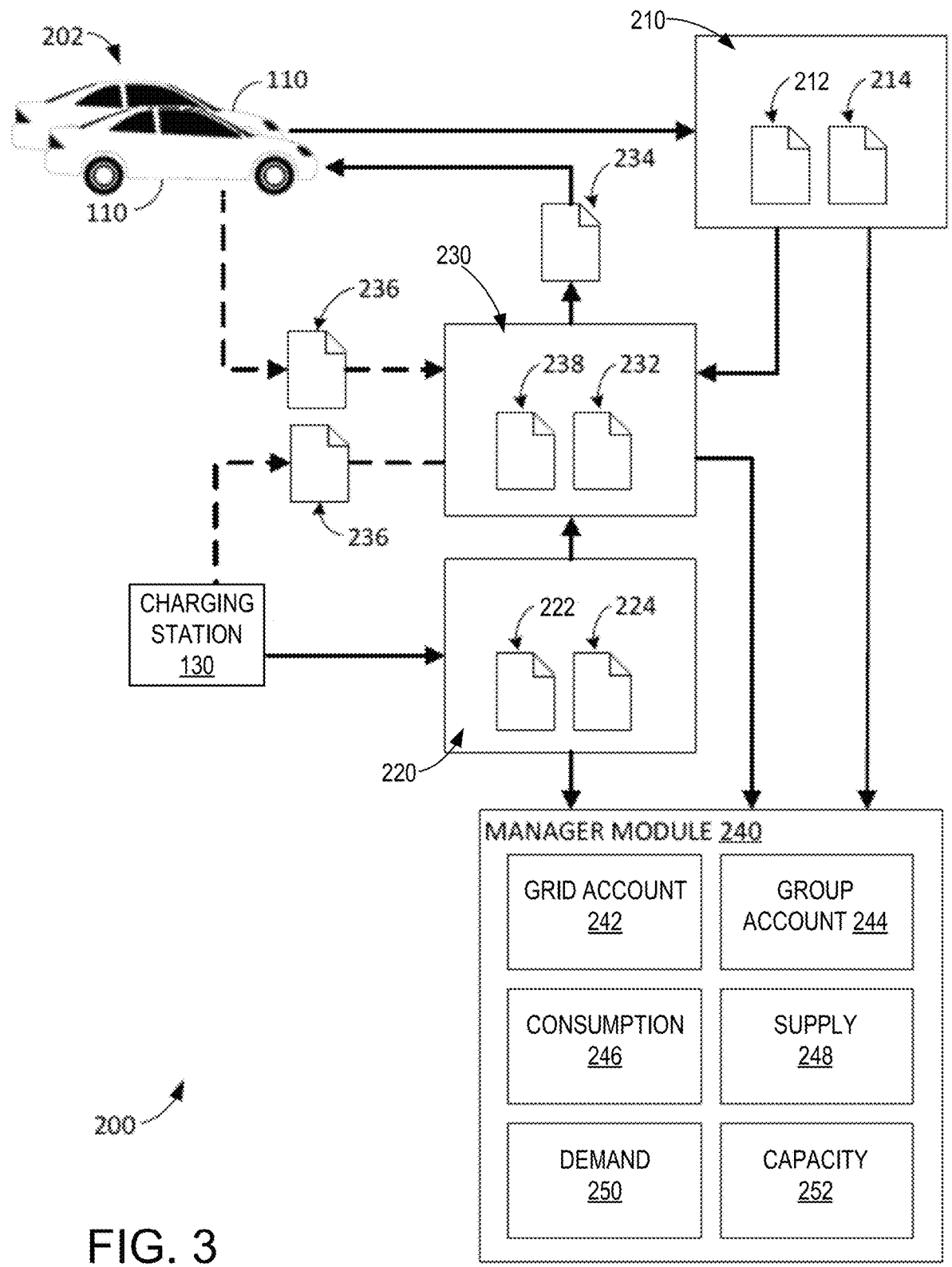
FIG. 3 includes a block diagram of an example vehicle-grid integration (VGI) management system that may be used to manage a plurality of vehicles, such as the vehicles shown in FIG. 1, in accordance with aspects of the present disclosure.

FIG. 3 shows an example vehicle-grid integration (VGI) management system 200 including a plurality of modules that facilitate managing and/or coordinating use of the power grid 130 by a vehicle group 202 (e.g., a user group 32 including a plurality of EVs 110). The vehicle group 202 may be used, for example, to provide dispatch and fulfilment capabilities for grid services including a demand response, a load curtailment, a load shifting, a coordinated load profile, and/or simultaneous execution of these and/or other multiple use cases. The vehicle group 202 enables the EVs 110 in the vehicle group 202 to gain leverage against suppliers of conventional and/or renewable power (e.g., power stations 12, utilities 16, grid operators 20). As used herein, a "module" may include, but is not limited to, non-transitory computer readable medium that stores instructions, instructions in execution on a machine, hardware, firmware, software in execution on a machine, and/or combinations thereof to perform one or more functions or actions and/or to cause one or more functions or actions from another module, method, and/or system. A "module" may also include logic, a software-controlled microprocessor, a discrete logic circuit, an analog circuit, a digital circuit, a programmed logic device, logic gates, and/or other circuit components. Multiple modules may be combined into a single module, and/or a single module may be distributed among multiple modules.

As shown in FIG. 3, the VGI management system 200 may include a group module 210 that determines a relationship between each EV 110 in the vehicle group 202, including a first EV 110 (e.g., BEV 112, PHEV 114, or FCEV 116), and the vehicle group 202. In some examples, the group module 210 may determine one or more vehicle group parameters 212 associated with the vehicle group 202. As used herein, a "parameter" may include, but is not limited to, a numerical or other kind of value or level such as a percentage, a non-numerical value, a discrete state, a discrete value, a continuous value, and/or a range, among others. Example vehicle group parameters 212 include, without limitation, a vehicle group territory (e.g., an area in which EVs 110 in the vehicle group 202 are allowed or instructed to be), a vehicle group supply (e.g., an aggregate amount of energy stored by the vehicle group 202), and/or a vehicle group demand (e.g., an aggregate amount of energy requested by the vehicle group 202). In some examples, the group module 210 determines the vehicle group parameters 212 based on one or more vehicle parameters 214 associated with each EV 110 in the vehicle group 202, including a first vehicle parameter 214 associated with the first EV 110. Example vehicle parameters 214 include, without limitation, a vehicle status, a vehicle location, a vehicle territory (e.g., an area in which an EV 110 is allowed or instructed to be), a battery type, a battery capacity, a state of charge, a fuel level, a fuel efficiency, a vehicle range, a traffic condition, a weather condition, a forecasted seasonal parameter, and a plurality of relevant energy and/or fuel prices, such as a vehicle fuel purchase price (e.g., per gallon or kilowatt-hour (kWh)), a vehicle fuel sale price (e.g., per gallon or kWh), a vehicle energy purchase price (e.g., per gallon or kWh), and a vehicle energy sale price (e.g., per gallon or kWh). During any time period, the battery state of charge may range from "empty" (e.g., zero or a predetermined low state of charge) to "full" (100% or a predetermined high state of charge) and the EV's capacity may vary by vehicle and age of the battery.

In some examples, the VGI management system 200 may include a grid module 220 that determines one or more grid parameters 222 for use in predicting load and/or generation resources to ensure grid stability. Example grid parameters 222 may include, without limitation, a grid territory (e.g., an area in which the power grid 130 delivers power), a grid capacity (e.g., an amount of power the power grid 130 is able to provide), and/or a grid demand (e.g., an amount of electricity drawn from the power grid 130 at a given time). In some examples, the grid module 220 determines the grid parameters 222 based on one or more station parameters 224 associated with the charging stations 132 coupled to the power grid 130, including a first station parameter 224 associated with a first charging station 132. Example station parameters 224 include, without limitation, a station status, a station location, an instrumentation, a fuel type, a station fuel purchase price (e.g., per gallon or kWh), a station fuel sale price (e.g., per gallon or kWh), a station energy purchase price (e.g., per gallon or kWh), and a station energy sale price (e.g., per gallon or kWh).

In some examples, the VGI management system 200 may include a control module 230 that facilitates integrating the EVs 110 with the power grid 130 in an organized manner. For example, the control module 230 may communicate with the group module 210 and/or grid module 220 to determine one or more opportunities to address grid performance, balancing and/or management issues. In some examples, the control module 230 may facilitate controlling the vehicle group 202 to use the batteries 122 of the EVs 110 as a dynamically recruitable and configurable energy storage system or systems comprising a VGI network in order to selectively provide dispatchable energy storage services for the power grid 130. In some examples, the control module 230 analyzes the vehicle group parameters 212, vehicle parameters 214, grid parameters 222, and/or station parameters 224 to determine a plurality of service parameters 232, and uses the service parameters 232 to generate a plurality of instructions 234 for use in selectively directing and/or operating the EVs 110 to charge batteries 122, discharge batteries 122, and/or automated or recommended instructions to fill fuel tanks 126 or target a particular SOC at the charging stations 132. The EVs 110 may be directed and/or operated, for example, (i) to charge batteries 122 and draw electricity from the power grid 130 (e.g., at a charging station 132) when and/or where vehicle group supply or grid demand are relatively low or when and/or where vehicle group demand or grid capacity are relatively high and/or (ii) to discharge batteries 122 and deliver electricity into the power grid 130 (e.g., at a charging station 132) when and/or where vehicle group supply or grid demand are relatively high or when and/or where vehicle group demand or grid capacity are relatively low. Example service parameters 232 include, without limitation, a service type, a service time (e.g., a service duration, a transit duration, a pick-up time, a drop-off time), a service location (e.g., a service location, a pick-up location, a drop-off location), and/or a service cost (e.g., per kWh, per transaction), as well as other additional data sets such as weather, traffic, forecasted seasonal parameters, predictive analytics for charging and driving behavior and others.

The control module 230 may analyze the vehicle parameters 214 associated with a plurality of EVs 110 to select a first EV 110 from the plurality of EVs 110, and transmit the instructions 234 to the first EV 110 for execution. The first EV 110 may be selected, for example, based on a vehicle status, a vehicle location, a vehicle territory, a battery type, a battery capacity, a state of charge, a fuel level, a fuel efficiency, a vehicle range, a vehicle range, a traffic condition, a weather condition, a forecasted seasonal parameter, and a plurality of relevant energy and/or fuel prices, such as a vehicle fuel purchase price, a vehicle fuel sale price, a vehicle energy purchase price, and a vehicle energy sale price. In some examples, the control module 230 transmits the instructions 234 directly to the first EV 110. Moreover, in some examples, the control module 230 may analyze the station parameters 224 associated with a plurality of charging stations 132 to select a first charging station 132 at which the first EV 110 is provide one or more grid services. The first charging station 132 may be selected, for example, based on a station status, a station location, an instrumentation, a fuel type, a station fuel purchase price, a station fuel sale price, a station energy purchase price, and/or a station energy sale price.

In some examples, the control module 230 directs and/or operates the EVs 110 to manage and/or undertake one or more service requests 236 received from one or more service requesters (e.g., power stations 12, utilities 16, grid operators 20, EVs 110, charging stations 132). For example, the control module 230 may analyze a service request 236 to recognize or identify one or more request parameters 238, and determine one or more service parameters 232 that satisfy or meet the request parameters 238. Example request parameters 238 include, without limitation, a requested service type, a request time (e.g., a request submission time, a requested service duration, a transit duration, a pick-up time, a drop-off time), a request service location (e.g., a vehicle location, a station location, a requested service location, a pick-up location, a drop-off location), and/or a requested service cost (e.g., per kWh, per transaction).

In some examples, the VGI management system 200 may include a manager module 240 that monitors use of the power grid 130 and/or a charging station 132 by an EV 110. For example, the manager module 240 may communicate with the group module 210, grid module 220, and/or control module 230 over a period of time to determine vehicle group parameters 212, vehicle parameters 214, grid parameters 222, and/or station parameters 224 and recognize or identify one or more trends or patterns in the vehicle group parameters 212, vehicle parameters 214, grid parameters 222, and/or station parameters 224, including peak and off-peak times and/or locations. In this manner, various parameters may be used to predict the behavior of EVs 110, the power grid 130, and/or charging stations 132 and generate one or more projected or predicted parameters. In some examples, the system server 420 includes, is included in, or is coupled to one or more artificial neural networks that "learn" and/or evolve based on information or insights gained through the processing of vehicle group parameters 212, vehicle parameters 214, grid parameters 222, station parameters 224, service parameters 232, instructions 234, service requests 236, and/or request parameters 238.

In some examples, VGI interaction at a point of common coupling may be governed by a dual multi-part rate structure, under which each (vis-à-vis "dual") operation, both consumption and supply, of the behind the meter (BTM) grid-connected equipment ("host site equipment" or "BTM VGI enabled equipment") and the energy supplied by the grid operator 20 and utility 16 and/or contracted energy service provider may determine and account for the various transfer of energy from and to the power grid 130 by the EV 110 in a plurality of portions. For example, the manager module 240 may determine and account for the various energy transfer of the power grid 130 by the EV 110 in a dual multi-part rate structure including a grid account portion 242, a group account portion 244, a consumption portion 246, a supply portion 248, a demand portion 250, and/or a capacity portion 252. The grid account portion 242 is representative of an underlying relationship between the EV 110 and the power grid 130 (e.g., utility 16, aggregator 30, charging station 132). The grid account portion 242 may include, for example, an account charge, an administration charge, an installation charge, a meter charge, and/or a penalty charge for connecting to the power grid 130 (or having the ability to connect to the power grid 130). The group account portion 244 is representative of an underlying relationship between the EV 110 and the vehicle group 202, as well as any secondary relationship with the power grid 130 (e.g., utility 16, aggregator 30, charging station 132) due to being a member of the vehicle group 202. The group account portion 244 may include, for example, an account charge, an administration charge, an initiation charge, and/or a penalty charge for being a member of the vehicle group 202. The consumption portion 246 is representative of an amount of electricity drawn from the power grid 130 (e.g., at a charging station 132) by the EV 110. The consumption portion 246 may include, for example, a volumetric charge for an amount of electricity drawn from the power grid 130 over a predetermined time period (e.g., in kWh). The supply portion 248 is representative of an amount of electricity delivered to the power grid 130 (e.g., at a charging station 132) by the EV 110. The supply portion 248 may include, for example, a volumetric credit for an amount of electricity delivered to the power grid 130 over a predetermined time period (e.g., in kWh). The demand portion 250 is representative of an upper threshold of consumption by the EV 110. The demand portion 250 may include, for example, a demand charge for an amount of electricity drawn from the power grid 130 at a particular point in time (e.g., in kW). The capacity portion 252 is representative of an upper threshold of power provided by the EV 110. The capacity portion 252 may include, for example, a capacity credit for an amount of power the EV 110 is able to deliver to the power grid 130 at a particular point in time (e.g., in kW).

In some examples, the VGI management system 200 includes one or more receivers, transmitters, and/or transceivers that enable the VGI management system 200 and its components (e.g., group module 210, grid module 220, control module 230, manager module 240) to communicate with one or more remote devices (e.g., at EVs 110 or charging stations 132). The group module 210, grid module 220, control module 230, and/or manager module 240 may communicate using one or more communication protocols. Example communication protocols include, without limitation, a BLUETOOTH® brand communication protocol, a ZIGBEE® brand communication protocol, a Z-WAVE™ brand communication protocol, a WI-FI® brand communication protocol, a near field communication (NFC) communication protocol, a radio-frequency identification (RFID) communication protocol, and a cellular data communication protocol (BLUETOOTH® is a registered trademark of Bluetooth Special Interest Group ZIGBEE® is a registered trademark of ZigBee Alliance Corporation, and Z-WAVE™ is a trademark of Sigma Designs, Inc. WI-FI® is a registered trademark of the Wi-Fi Alliance).

Figure 4:
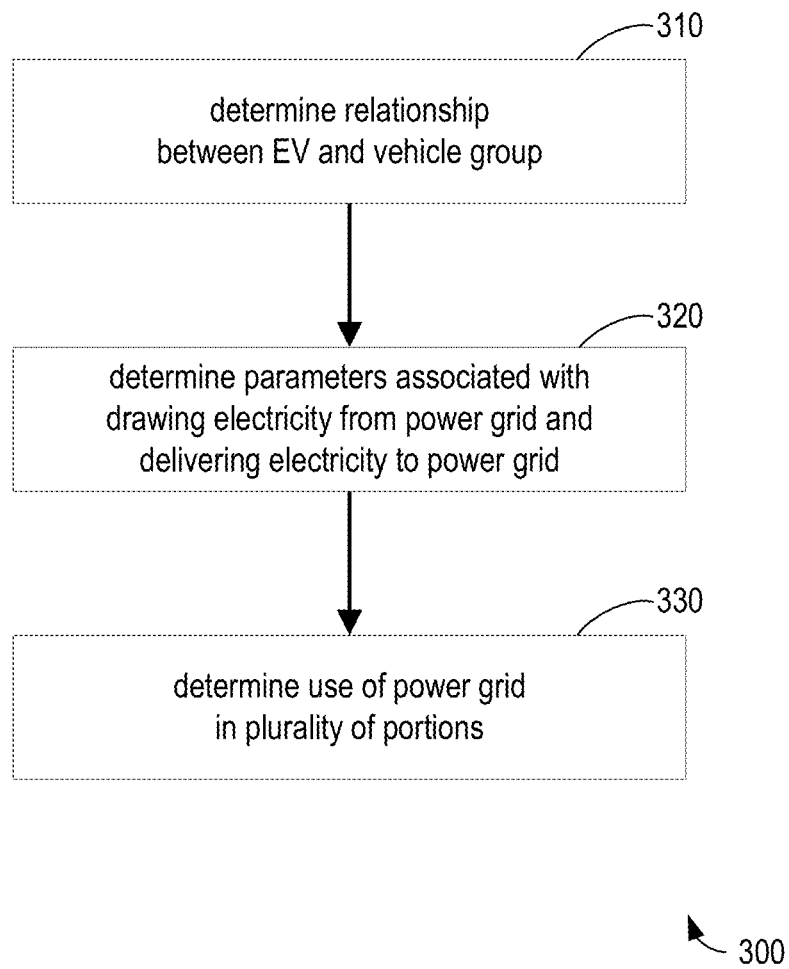
FIG. 4 includes a flowchart of an example method of managing a plurality of vehicles using a system, such as the VGI management system shown in FIG. 3, in accordance with aspects of the present disclosure.

FIG. 4 shows an example method 300 of managing vehicle-grid integration using the VGI management system 200 (shown in FIG. 3). The method 300 includes various operations that may be performed or executed by the VGI management system 200 to manage vehicle-grid integration in an organized, systematic, and equitable manner. The method 300 will be described with reference to the components of the electric system 10 shown in FIG. 1, the environment 100 shown in FIG. 2, and the VGI management system 200 shown in FIG. 3, though it is to be appreciated that the method 300 may be used with other systems and/or components.

The method 300 may include determining a relationship between an EV 110 and a vehicle group 202 at operation 310. As a member of the vehicle group 202, the EV 110 may be used to provide one or more grid services (e.g., at one or more charging stations 132) to facilitate addressing grid balancing and/or management issues. In some examples, the EV 110 may directed and/or operated in accordance with instructions 234 generated based on service parameters 232, such as quantities, prices, times, and/or locations at which the vehicle group 202 is to purchase and/or supply electricity. For example, the EV 110 may be instructed to charge its batteries 122 and/or fill its fuel tank 126 when and/or where the grid demand and/or station sale price are relatively low. In another example, the EV 110 may be instructed to discharge its batteries 122 when and/or where the grid demand and/or station purchase price are relatively high. In this manner, the vehicle group 202 may systematically utilize the amount of usable energy stored in and/or the aggregate capacity of the batteries 122 of the EVs 110 in the vehicle group 202.

In some examples, the instructions 234 may be generated and/or the EV 110 may be selected based on a demand for one or more grid services at a particular time and/or location, a quantity of available EVs 110, a state of charge of each EV 110, and/or a distance between each EV 110 and each charging station 132. In one example, the EV 110 may be selected to draw electricity from the power grid 130 when a state of charge and/or vehicle range fall below a predetermined threshold, at a charging station 132 selected based on a distance between the vehicle location and the station location (e.g., the distance is less than the vehicle range) and a station sale price. In this manner, the EV 110 may have confidence in its ability to reach the charging station 132 and charge its batteries 122 at a desirable price. In another example, the EV 110 may be selected to feed electricity into the power grid 130 at a charging station 132 when a station purchase price rises above a predetermined threshold and a vehicle range is greater than a distance between the vehicle location and the station location. In this manner, the EV 110 may have confidence in its ability to reach the charging station 132 and discharge its batteries 122 at a desirable price.

In some examples, an EV 110 and/or charging station 132 are eligible for selection and, thus, may be selected when deemed available or unoccupied. On the other hand, an EV 110 and/or charging station 132 may not be eligible for selection and, thus, may not be selected when deemed unavailable or occupied. An EV 110 and/or charging station 132 may be deemed unavailable or occupied, for example, when they are assigned to a pending or active service (e.g., actively providing or dispatched to provide a grid service) and/or when they are off duty or out of service (e.g., for maintenance). In some examples, projected vehicle parameters 214 and/or station parameters 224 may be used to determine prospective availability of an EV 110 and/or charging station 132, respectively. For example, a service duration associated with an occupied EV 110 may be used to determine when the occupied EV 110 will become unoccupied and, thus, available to perform one or more grid services. The service duration may be determined based on a vehicle type, a fuel level, a route or travel distance between locations, and/or traffic conditions.

To account for the various uses of the power grid 130 by the EV 110, a first plurality of parameters associated with the drawing of electricity from the power grid 130 and a second plurality of parameters associated with the feeding of electricity into the power grid 130 may be determined at operation 320. The first plurality of parameters may include, for example, a first volume and a first threshold amount over a predetermined time period (e.g., consumption portion 246 and demand portion 250, respectively). The second plurality of parameters may include, for example, a second volume and a second threshold amount over the predetermined time period (e.g., supply portion 248 and capacity portion 252, respectively). This enables charges and/or credits to be accurately allocated to the EVs 110, whether a net consumer and/or a net supplier. In some examples, use of the power grid 130 may be determined at operation 330 in a dual multi-part rate structure, including a grid account portion 242 associated with the relationship between the EV 110 and the power grid 130 (e.g., utility 16, aggregator 30, charging station 132), a group account portion 244 associated with the relationship between the EV 110 and the vehicle group 202, a consumption portion 246 associated with the first volume, a supply portion 248 associated with the second volume, a demand portion 250 associated with the first threshold amount, and a capacity portion 252 associated with the second threshold amount. In some examples, the various uses and/or services may be monitored to manage a plurality of rate categories, including residential, residential VGI, commercial and industrial (C&I), and/or C&I VGI.

Figure 5:
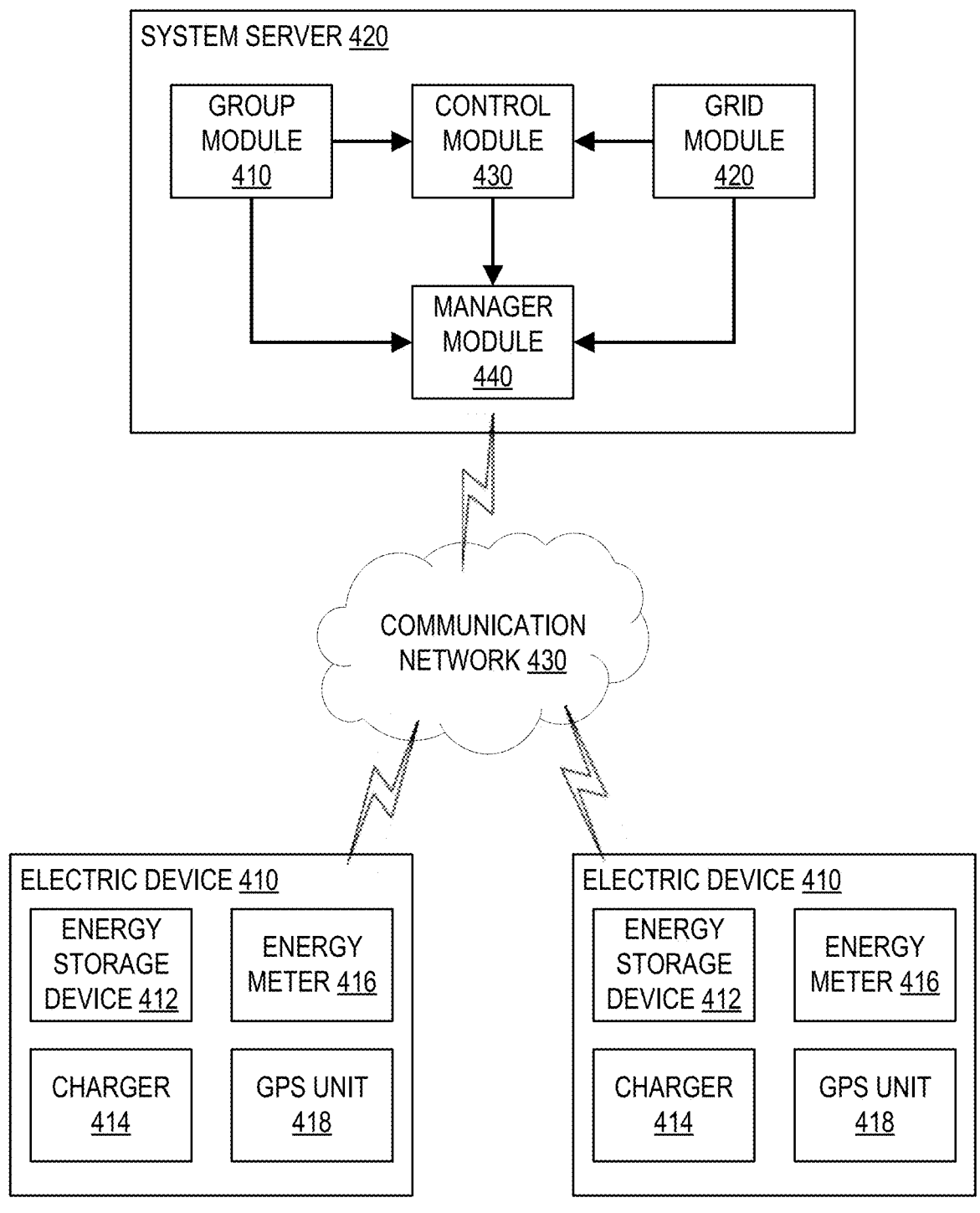
FIG. 5 includes a block diagram of an example cloud-based environment for managing a plurality of electronic devices using a system, such as the VGI management system shown in FIG. 3, in accordance with aspects of the present disclosure.

FIG. 5 shows an example cloud-based environment 400 including a plurality of electric devices 410 associated with one or more members of a user group 32 (e.g., users 14). For example, the electric devices 410 may be, be included in, or be coupled to an EV 110 in a vehicle group 202. An electric device 410 may include one or more energy storage devices 412 (e.g., batteries 122) and a charger 414 configured to couple the electric device 410 to the power grid 130. The charger 414 may be used to control a flow of power between the energy storage device 412 and the power grid 130. In some examples, the electric device 410 may include an energy meter 416 that detects and/or determines a quantity and/or direction of the flow or power. Alternatively, one or more energy meters 416 may be at one or more predetermined locations on the power grid 130 (e.g., at a charging station 132). In some examples, the energy meter 416 may be used to detect and/or determine a state of charge associated with the energy storage device 412. The state of charge may be used, for example, to determine a vehicle range.

As shown in FIG. 5, the electric devices 410 may include Global Positioning System (GPS) units 418 that enable a location of the electric devices 410 to be determined (e.g., vehicle location). Additionally or alternatively, the location of an electric device 410 may be determined based on a detection and/or recognition of a unique identifier associated with the electric device 410 and/or one of its components (e.g., energy storage device 412, charger 414, energy meter 416, GPS unit 418). The unique identifier may be detected, for example, when the electric device 410 is coupled to the power grid 130 (e.g., via EVSE 134). Location data may be used, for example, to determine a traffic condition.

The electric devices 410 may include one or more client-side applications that perform one or more operations at the electric devices 410 while one or more operations are performed remotely. For example, the client-side applications may allow the electric devices 410 to communicate with one or more other computing systems (e.g., on the "cloud") that perform one or more back-end operations using one or more counterpart applications (e.g., server-side applications) and/or through one or more server-side services. In some examples, the electric devices 410 transmit one or more signals associated with the energy storage devices 412, charger 414, energy meter 416, and/or GPS unit 418 to a system server 420 (e.g., VGI management system 200) for back-end processing.

The system server 420 may provide a shared pool of configurable computing resources to perform one or more back-end operations. The system server 420 may host or manage one or more server-side applications that include or are associated with VGI management technology, such as a GPS navigation application configured to provide navigation and traffic data and a resource management application configured to monitor electricity prices at one or more charging stations 132 over a period of time. The system server 420 may include or store data, such as vehicle group parameters 212, vehicle parameters 214, grid parameters 222, station parameters 224, service parameters 232, instructions 234, service requests 236, and/or request parameters 238. The data may be used, for example, to predict vehicle group supply, vehicle group demand, vehicle status, vehicle location(s), state(s) of charge, impact on or of traffic conditions, impacts of weather conditions, accuracy of seasonal parameters, trends based on vehicle use or purchase price(s), prevailing grid capacity, prevailing grid demand, station status, station sale prices, and/or station purchase prices and other derived information. In some examples, the system server 420 includes a group module 210, a grid module 220, a control module 230, and a manager module 240.

In some examples, the cloud-based environment 400 includes a communication network 430 that enables information to be communicated between computing systems coupled to the communication network 430 (e.g., EVs 110, charging stations 132, VGI management system 200, electric devices 410, system server 420). Communications between computing systems described herein can be a network transfer, a file transfer, an applet transfer, an email, a hypertext transfer protocol (HTTP) transfer, and other methods. A computer communication can occur across a wireless system (e.g., IEEE 802.11), an Ethernet system (e.g., IEEE 802.3), a token ring system (e.g., IEEE 802.5), a personal area network (PAN), a local area network (LAN), a wide area network (WAN), a point-to-point system, a circuit switching system, a packet switching system, among others. Example communication networks 430 include, without limitation, a cellular network, the Internet, a PAN, a LAN, and a WAN. One or more interfaces (not shown) may facilitate communication within the cloud-based environment 400. The interfaces may include one or more gateways that allow the system server 420 and electric devices 410 to communicate with each other and/or with one or more other computing systems for performing one or more operations. For example, the gateways may format data and/or control one or more data exchanges using an Open Systems Interconnection (OSI) model that enables the computing systems (e.g., electric devices 410, system server 420) to communicate using one or more communication protocols. In some examples, the gateways identify and/or locate one or more target computing systems to selectively route data in and/or through the cloud-based environment 400.

Figure 6:
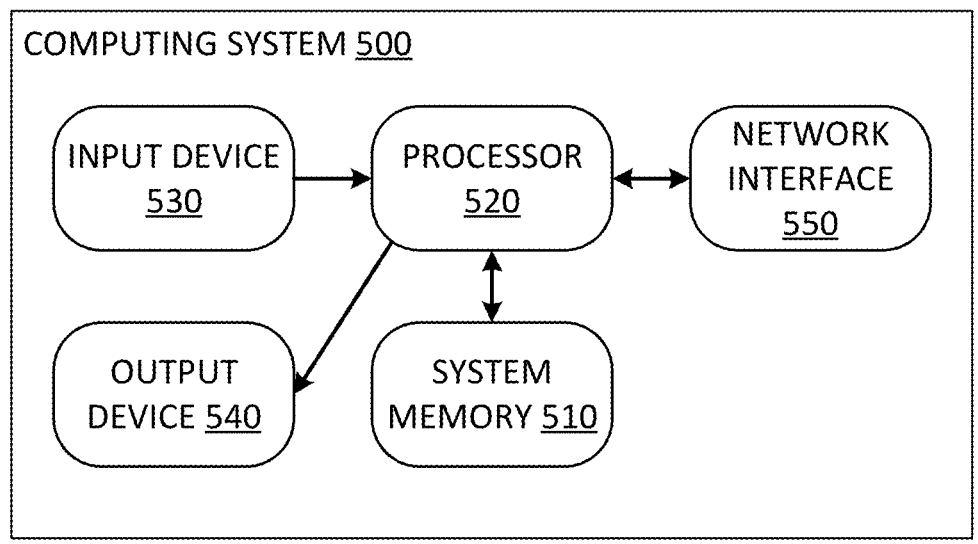
FIG. 6 includes a block diagram of an example computing system for performing one or more operations in accordance with aspects of the present disclosure.

FIG. 6 shows an example computing system 500 configured to perform one or more computing operations. While some examples of the disclosure are illustrated and described herein with reference to the computing system 500 being included in a VGI management system 200 (shown in FIG. 3) and/or a system server 420 (shown in FIG. 5), aspects of the disclosure are operable with any computing system (e.g., EV 110, charging station 132, group module 210, grid module 220, control module 230, manager module 240, electric device 410, energy storage device 412, charger 414, energy meter 416, GPS unit 418) that executes instructions to implement the operations and functionality associated with the computing system 500. The computing system 500 shows only one example of a computing environment for performing one or more computing operations and is not intended to suggest any limitation as to the scope of use or functionality of the disclosure.

In some examples, the computing system 500 includes a system memory 510 (e.g., computer storage media) and a processor 520 coupled to the system memory 510. The processor 520 may include one or more processing units (e.g., in a multi-core configuration). Although the processor 520 is shown separate from the system memory 510, examples of the disclosure contemplate that the system memory 510 may be onboard the processor 520, such as in some embedded systems. As used herein, a "processor" processes signals and performs general computing and arithmetic functions. Signals processed by the processor 520 can include digital signals, data signals, computer instructions, processor instructions, messages, a bit, a bit stream, or other means that can be received, transmitted and/or detected. Generally, the processor 520 can be a variety of various processors including multiple single and multicore processors and co-processors and other multiple single and multicore processor and co-processor architectures. The processor 520 can include various units to execute various functions.

The system memory 510 stores data associated with a plurality of users 14, EVs 110, power grid 130, and/or charging stations 132, and computer-executable instructions, and the processor 520 is programmed or configured to execute the computer-executable instructions for implementing aspects of the disclosure using, for example, the VGI management system 200. For example, at least some data may be associated with one or more EVs 110 (e.g., vehicle group parameters 212, vehicle parameters 214), charging stations 132 (e.g., grid parameters 222, station parameters 224), and/or grid services (e.g., service parameters 232, instructions 234, service requests 236, request parameters 238), such that the computer-executable instructions enable the processor 520 to manage or control one or more operations of the VGI management system 200, such as the coordinated charging and discharging of a plurality of EVs 110.

The system memory 510 includes one or more computer-readable media that allow information, such as the computer-executable instructions and other data, to be stored and/or retrieved by the processor 520. In some examples, the processor 520 executes the computer-executable instructions to determine a relationship between an EV 110 and a vehicle group 202, determine a first plurality of parameters associated with a drawing of electricity from the power grid 130 by the EV 110 and a second plurality of parameters associated with a delivery or supply of electricity to the power grid 130 by the EV 110, determine use of the power grid 130 by the EV 110 in a dual multi-part rate structure, including a grid account portion 242, a group account portion 244, a consumption portion 246, a supply portion 248, a demand portion 250, and a capacity portion 252. In this manner, charges and credits for power and/or grid services may be more precisely and transparently allocated and/or attributed.

By way of example, and not limitation, computer-readable media may include computer storage media and communication media. Computer storage media are tangible and mutually exclusive to communication media. For example, the system memory 510 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 520. The system memory 510 can store an operating system that controls or allocates resources of the computing system 500. Computer storage media are implemented in hardware and exclude carrier waves and propagated signals. That is, computer storage media for purposes of this disclosure are not signals per se.

A user or operator may enter commands and other input into the computing system 500 through one or more input devices 530 coupled to the processor 520. The input devices 530 are configured to receive information. Example input device 530 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 540 coupled to the processor 520. The output devices 540 are configured to convey information. Example, output devices 540 include, without limitation, a monitor, a projector, a printer, a speaker, a vibrating component. In some examples, an output device 540 is integrated with an input device 530 (e.g., a capacitive touch-screen panel, a controller including a vibrating component).

One or more network interfaces 550 may be used to operate the computing system 500 in a networked environment using one or more logical connections. Logical connections include, for example, local area networks, wide area networks, and the Internet. The network interfaces 550 allow the processor 520, for example, to convey information to and/or receive information from one or more remote devices, such as another computing system or one or more remote computer storage media. Network interfaces 550 may include a network adapter, such as a wired or wireless network adapter or a wireless data transceiver.

In some examples, the computing system 500 may be used to provide grid services to achieve one or more objectives (e.g., cost savings, greenhouse gas savings). For example, grid services may be coordinated to dispatch renewable energy and/or to influence or benefit from prices at specific locations on the power grid 130 (e.g., regional load aggregation points (LAP), Sub-LAPs). The EVs 110 described herein may provide one or more grid services to provide a demand response or load curtailment (e.g., reducing an electrical load from the power grid 130 for a limited period of time in response to a service request 236), influence a load profile for the power grid 130 by coordinating the charging profiles of each EV 110, and/or executing multiple use cases simultaneously to achieve one or more objectives (e.g., cost savings, greenhouse gas savings).

The automated VGI management systems described herein facilitate managing vehicle-grid integration and enable strategically charging and discharging a plurality of electric vehicles. For example, example VGI management systems may execute and/or perform servicing decisions and/or operations to charge electric vehicles at lower prices and to discharge electric vehicles at higher prices. The servicing decisions and/or operations may be coordinated to direct or control the electric vehicles to operate in the common interest and function as a cohesive group of vehicles. Furthermore, the servicing decisions and/or operations may evolve based on information or insight gained over time, resulting in increased efficiency and/or accuracy.

Example systems and methods for managing VGI are described herein and illustrated in the accompanying drawings. Various examples may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes that may be substantially represented in machine-readable media and so executed by a computer or processor, whether or not such computer or processor is explicitly shown.

This written description uses examples to disclose aspects of the disclosure and also to enable a person skilled in the art to practice the aspects, including making or using the above-described systems and executing or performing the above-described methods. Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, asset management.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any of several sequences or order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

In view of the above, it will be seen that the several objects of the disclosure are achieved and other advantageous results attained. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle-grid integration (VGI) management system comprising:
   one or more computer storage media including data associated with a plurality of vehicles in a vehicle group including a first vehicle and computer-executable instructions; and
   one or more processors configured to execute the computer-executable instructions to:
      determine use of a power grid by the vehicle group, including use of the power grid by the first vehicle;
      account for the use of the power grid by the first vehicle in a dual multi-part rate structure including:
         a grid account portion representative of an underlying relationship between the first vehicle and the power grid,
         a group account portion representative of an underlying relationship between the vehicle group and the first vehicle,
         a consumption portion representative of a volume of electricity drawn from the power grid by the first vehicle over a predetermined time period,
         a supply portion representative of a volume of electricity delivered to the power grid by the first vehicle over the predetermined time period,
         a demand portion representative of an upper threshold of electricity drawn from the power grid by the first vehicle over the predetermined time period, and
         a capacity portion representative of an upper threshold of electricity delivered to the power grid by the first vehicle over the predetermined time period;
      analyze the use of the power grid by the vehicle group and one or more service parameters to select, from the plurality of vehicles in the vehicle group, the first vehicle;
      use the one or more service parameters to generate one or more instructions for use in selectively operating the first vehicle; and
      execute the one or more instructions to direct the first vehicle to at least one of draw electricity from the power grid and deliver electricity to the power grid.

2. The VGI management system of claim 1, wherein the one or more processors are further configured to execute the computer-executable instructions to select the first vehicle based on one or more of a vehicle status, a vehicle location, a vehicle territory, a state of charge, a fuel level, a fuel efficiency, a vehicle range, a traffic condition, a weather condition, a forecasted seasonal parameter, a vehicle fuel purchase price, a vehicle fuel sale price, a vehicle energy purchase price, and a vehicle energy sale price.

3. The VGI management system of claim 1, wherein the one or more processors are further configured to execute the computer-executable instructions to:
   determine one or more vehicle group parameters associated with the vehicle group; and
   use the one or more vehicle group parameters to determine the one or more service parameters.

4. The VGI management system of claim 1, wherein the one or more processors are further configured to execute the computer-executable instructions to:
   determine one or more grid parameters associated with the power grid; and
   use the one or more grid parameters to determine the one or more service parameters.

5. The VGI management system of claim 1, wherein the one or more processors are further configured to execute the computer-executable instructions to:

determine one or more station parameters associated with a charging station coupled to the power grid; and
use the one or more station parameters to determine the one or more service parameters.

6. The VGI management system of claim 5, wherein the one or more processors are further configured to execute the computer-executable instructions to select the charging station based on one or more of a station status, a station location, an instrumentation, a fuel type, a station fuel purchase price, a station fuel sale price, a station energy purchase price, and a station energy sale price.

7. The VGI management system of claim 1, wherein the one or more processors are further configured to execute the computer-executable instructions to:
receive a service request; and
use the service request to determine the one or more service parameters.

8. A computing system for managing vehicle-grid integration, the computing system comprising:
a group module that determines an underlying relationship between an electric vehicle and a vehicle group;
a manager module that monitors use of a power grid by the vehicle group and accounts for the use of the power grid by the electric vehicle in a dual multi-part rate structure including a grid account portion, a group account portion, a consumption portion, a supply portion, a demand portion, and a capacity portion, wherein the manager module determines the use of the power grid by the electric vehicle using a first plurality of parameters associated with a drawing of electrical energy from a power grid by the electric vehicle and a second plurality of parameters associated with a delivery of electrical energy to the power grid by the electric vehicle, the first plurality of parameters including a first volume and a first threshold amount of electricity drawn from the power grid by the electric vehicle over a predetermined time period, the second plurality of parameters including a second volume and a second threshold amount of electricity delivered to the power grid by the electric vehicle over the predetermined time period, and wherein the grid account portion is representative of an underlying relationship between the electric vehicle and the power grid, the group account portion is representative of the underlying relationship between the electric vehicle and the vehicle group, the consumption portion is representative of the first volume, the supply portion is representative of the second volume, the demand portion is representative of the first threshold amount, and the capacity portion is representative of the second threshold amount; and
a control module configured to analyze one or more service parameters, the first plurality of parameters, and the second plurality of parameters to select, from a plurality of vehicles in the vehicle group, the electric vehicle, use the one or more service parameters to generate one or more instructions for use in selectively operating the electric vehicle, and execute the one or more instructions to direct the electric vehicle to at least one of draw electricity from the power grid and deliver electricity to the power grid.

9. The computing system of claim 8, wherein the control module is configured to select the electric vehicle from the plurality of electric vehicles in the vehicle group based on one or more of a vehicle status, a vehicle location, a vehicle territory, a state of charge, a fuel level, a fuel efficiency, a vehicle range, a traffic condition, a weather condition, a forecasted seasonal parameter, a vehicle fuel purchase price, a vehicle fuel sale price, a vehicle energy purchase price, and a vehicle energy sale price.

10. The computing system of claim 8, wherein the group module is configured to use the first plurality of parameters and the second plurality of parameters to determine one or more vehicle group parameters associated with the vehicle group, and the control module is configured to use the one or more vehicle group parameters to determine the one or more service parameters.

11. The computing system of claim 8, further comprising:
a grid module configured to determine one or more grid parameters associated with the power grid, wherein the control module is configured to use the one or more grid parameters to determine the one or more service parameters.

12. The computing system of claim 8, further comprising:
a grid module configured to determine one or more station parameters associated with a charging station coupled to the power grid, wherein the control module is configured to use the one or more station parameters to determine the one or more service parameters.

13. The computing system of claim 12, wherein the control module is configured to select the charging station from a plurality of charging stations coupled to the power grid based on one or more of a station status, a station location, an instrumentation, a fuel type, a station fuel purchase price, a station fuel sale price, a station energy purchase price, and a station energy sale price.

14. The computing system of claim 8, wherein the control module is configured to receive a service request and use the service request to determine the one or more service parameters.

15. A method for managing vehicle-grid integration, the method comprising:
determining an underlying relationship between an electric vehicle and a vehicle group;
determining a first plurality of parameters associated with a drawing of electrical energy from a power grid by the electric vehicle and a second plurality of parameters associated with a supply of electrical energy to the power grid by the electric vehicle, the first plurality of parameters including a first volume and a first threshold amount of electricity drawn from the power grid by the electric vehicle over a predetermined time period, the second plurality of parameters including a second volume and a second threshold amount of electricity delivered to the power grid by the electric vehicle over the predetermined time period;
determining use of the power grid by the vehicle group, including use of the power grid by the electric vehicle;
account for the use of the power grid by the electric vehicle in a dual multi-part rate structure including a grid account portion representative of an underlying relationship between the electric vehicle and the power grid, a group account portion representative of the underlying relationship between the electric vehicle and the vehicle group, a consumption portion representative of the first volume, a supply portion representative of the second volume, a demand portion representative of the first threshold amount, and a capacity portion representative of the second threshold amount;
analyzing the use of the power grid by the vehicle group and one or more service parameters to select, from a plurality of vehicles in the vehicle group, the electric vehicle;

generating one or more instructions based on the one or more service parameters; and transmitting the one or more instructions to the electric vehicle for use in selectively operating the electric vehicle to at least one of draw electricity from the power grid and deliver electricity to the power grid.

16. The method of claim 15, wherein analyzing the one or more service parameters further comprises selecting the electric vehicle based on one or more of a vehicle status, a vehicle location, a vehicle territory, a state of charge, a fuel level, a fuel efficiency, a vehicle range, a traffic condition, a weather condition, a forecasted seasonal parameter, a vehicle fuel purchase price, a vehicle fuel sale price, a vehicle energy purchase price, and a vehicle energy sale price.

17. The method of claim 15, further comprising:

determining one or more vehicle group parameters associated with the vehicle group based on the first plurality of parameters and the second plurality of parameters;

determining one or more grid parameters associated with the power grid; and determining one or more station parameters associated with a charging station selected from a plurality of charging stations coupled to the power grid based on one or more of a station status, a station location, an instrumentation, a fuel type, a station fuel purchase price, a station fuel sale price, a station energy purchase price, and a station energy sale price, wherein the one or more service parameters are determined based on the one or more vehicle group parameters, the one or more grid parameters, and the one or more station parameters.

\* \* \* \* \*